Sept. 26, 1967 E. E. ERIKSSON ETAL 3,344,287

TEMPERATURE COMPENSATED VOLTAGE COMPARISON MEANS

Filed May 14, 1965

INVENTORS
ELOF ERIK ERIKSSON
HARALD NORBERT CHRISTIAN STANG
BY
Hane and Baxley
ATTORNEYS United States Patent Office 3,344,287
Patented Sept. 26, 1967

3,344,287

TEMPERATURE COMPENSATED VOLTAGE COMPARISON MEANS

Elof Erik Eriksson, Bandhagen, and Harald Norbert Christian Stang, Hagersten, Sweden, assignors to Telefonaktiebolaget L M Ericsson, Stockholm, Sweden, a corporation of Sweden Filed May 14, 1965, Ser. No. 455,812
Claims priority, application Sweden, June 4, 1964, 6,782/64
3 Claims. (Cl. 307—88.5)

ABSTRACT OF THE DISCLOSURE

There is disclosed a voltage comparison circuit which includes a transistor blocking oscillator circuit wherein a varying voltage and a reference voltage are fed by a parallel voltage adder circuit to the base of the transistor. The primary and secondary of the block oscillator transformer are connected to the collector and emitter, respectively, of the transistor. A temperature compensating transistor with a fixed base voltage has its emitter connected to the secondary of the blocking oscillator transformer. A pulse receiving gating circuit is connected to the junction of the emitter of the compensating transistor and the secondary of the transformer which permits both transistors to conduct only when a pulse is received.

Figure 1:
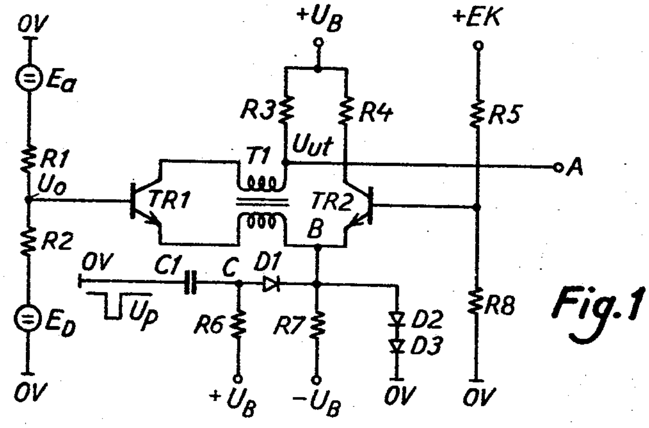

The present invention refers to a circuit for comparing a varying voltage with a reference voltage and for producing a signal dependent on the comparison result if the voltages are different in a given direction. Circuits of this type usually include a regenerative amplifier consisting of a transistor having a base which receives the voltage different between the two voltages being compared, and a transformer having a primary winding which is inserted in the collector circuit of the transistor and the secondary winding which is inserted in the emitter circuit of the transistor. The emitter-collector circuit is blocked and is rendered conducting by means of pulse-shaped signals whose occurrence is a second condition of the function of the regenerative amplifier besides the condition that the transistor shall become conducting when said voltage difference reaches a definite value.

The base-emitter voltage of the transistor is dependent on the temperature of the transistor so that a temperature compensation is necessary in order that the transistor always be activated by the same base voltage to give a correct comparison result. This may be effected if the reference voltage is not directly connected to the emitter of the transistor but is connected through a circuit including a second transistor which is identical with the first mentioned transistor and is exposed to the same temperature influence. The second transistor is connected in such a way that a temperature change which, for example, increases the base-emitter voltage of the first transistor will also increase the base-emitter voltage of the second transistor and therefore decrease the emitter voltage of the first transistors, so that the conducting condition of the first transistor occurs at the same base potential irrespectively of the temperature.

The disadvantage of this solution is that the compensating transistor is conducting all the time while the comparison transistor itself can be conducting only during the time it receives the pulse-shaped signals. This implies that the compensating transistor works with a constant effect which is higher than the effect of the comparison transistor which last mentioned effect is dependent on the scanning frequency and on the varying voltage, so that the compensation will not be complete.

An object of the invention is to produce a temperature compensation of the above mentioned type in which there is no substantial difference in effect between the comparison transistor and the compensating transistor and in which both transistors are conducting only during the duration of the pulse, so that the effect of the transistors becomes very low.

The circuit according to the invention is substantially characterized so that in order to compensate for variations in the base-emitter voltage of the transistor, arising due to temperature changes, the emitter-collector circuit of the transistor is connected in parallel with the emitter-collector circuit of a second transistor. The emitter electrodes of both transistors are connected to a potential that normally blocks the transistors. A gate circuit is arranged which, during the time it obtains an impulse, nullifies the blocking potential in order to allow the operation of the regenerative amplifier if the first mentioned transistor is coincidentally activated by the voltage difference.

Figure 2A:
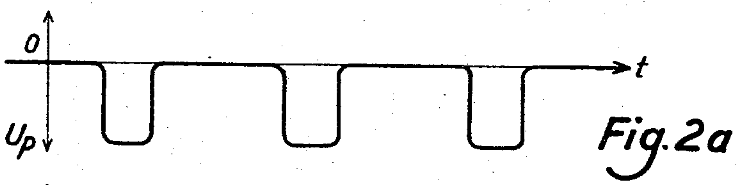
Figure 2B:
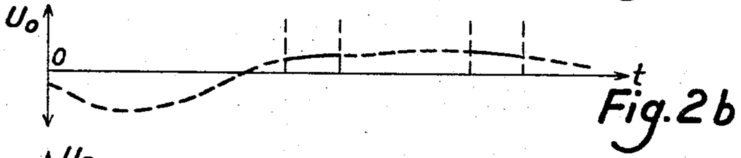
Figure 2C:
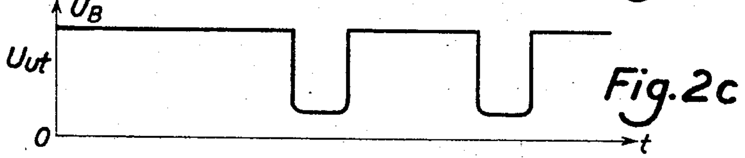

The invention will be explained below by means of an embodiment with reference to the accompanying drawing in which FIG. 1 shows a circuit diagram of a voltage comparing apparatus according to the invention, FIG. 22 shows the waveform of the control pulses, FIG. 2*b* shows the process of the varying voltage and FIG. 2*c* shows the waveform of the pulses obtained on the output.

By TR1 is indicated in FIG. 1 a transistor having a base which is supplied with the voltage difference between an incoming varying voltage Ea and a reference voltage $E_D$. These voltages are connected through a voltage divider R1, R2 to the base of transistor TR1. The emitter circuit of the transistor TR1 includes the secondary winding of a transformer T1. The primary winding of T1 is included in the collector circuit of transistor TR1 and is connected via a resistance R3 to a voltage source $U_B$. To the same voltage source is connected through a resistance R4 to the collector of a compensating transistor TR2 that is identical with the transistor TR1. The emitter of transistor TR2 is connected to the emitter of the transistor TR1 through the primary winding of the transformer T1. The base of the transistor TR2 is connected to a voltage divider intended for fine adjustment of the operating level $U_0$ of the discriminator (about 0 volts). To the emitters of the transistors is connected a circuit consisting of three parallel branches; the resistance R6 connected to the voltage $+U_B$ in series with a rectifier D1, a resistance R7 connected to a negative voltage $-U_B$ and two rectifiers D2 and D3 which are connected in series to 0-potential. The control is carried out by means of negative going pulses which are fed to the junction of the resistance R6 and of the rectifier D1 through a capacitor C1.

In the absence of pulses, a current passes from the voltage source $+U_B$ through the resistance R6 and the rectifiers D1, D2 and D3 to 0-potential whereby the point B will be at a positive voltage that maintains the transistors blocked against any maximum positive input voltage. If a negative control pulse according to FIG. 2*a* is fed to the point C, the diode D1 will be blocked, the point B is drawn to a negative potential and the transistor TR2 becomes conducting. When the base potential of transistor TR1 (indicated in FIG. 2*b*) exceeds a definite value, a base current will pass in the transistor TR1, the blocking oscillator begins to regenerate and the transistor TR1 reaches saturation. FIG. 2*c* shows the pulses obtained on the output A. The duration of the pulse will be, on the whole, determined by the inductance of the transformer T1 and by the resistance R3, if the gate pulse does not cease earlier. The operation point of the transistor TR1 is set by adjusting the base potential of the second transistor TR2 by means of the voltage divider R5, R8. As indicated the compensating transistor TR2 becomes conducting only during the duration of the gate pulses thus during the same time as the comparison transistor TR1 is conducting, which implies that the effect of both transistors will be equal if transistor TR1 is activated. In addition the compensation will be more complete than if the compensating transistor would have been conducting all the time as in the previously known arrangements. If, for example, due to temperature change a higher voltage should be necessary on the base of the transistor TR1 in order to render the same conducting, the potential of the emitter will be decreased in a corresponding degree due to the increased voltage in the base-emitter circuit of the transistor TR2 and when the gate pulses nullify the blocking in the emitter circuit, the conducting condition of the transistor TR1 will consequently always occur at the same base voltage, irrespective of the temperature variations. The fundamental principle of the invention is of course are valid independently of whether transistors of pnp- or of npn-type are used.

We claim:

1. A circuit system for comparing a varying voltage with a reference voltage to produce a signal when the difference between the varying voltage and the reference voltage is of a given polarity, said circuit system comprising:

a regenerative amplifier including a first transistor having base, collector and emitter electrodes, and a transformer having a primary and a secondary winding, means for connecting one end of said primary winding to said collector electrode, means for connecting one end of said secondary winding to said emitter electrode, means for applying an operating voltage to the other end of said primary winding, and means for applying said varying voltage and said reference voltage superpositioned to said base electrode;

a temperature compensating circuit including a second transistor having base, emitter and collector electrodes, means for applying an operating voltage to the collector electrode of the second transistor, and means for applying a bias voltage to the base electrode of the second transistor;

junction means for connecting the emitter electrode of said second transistor to the other end of said secondary winding;

control means for normally applying a voltage to said junction means for preventing conduction of both of said transistors, said control means being adapted to receive pulse signals for changing the voltage applied to said junction means for the duration of each received pulse signal to permit conduction of both of said transistors; and signal output means connected to the collector terminal of said first transistor for transmitting output signals.

2. The circuit of claim 1 wherein said transistors are of the n-p-n type, and said signal output means transmits a pulse signal whenever said control means received a pulse signal and said varying voltage is more positive than said reference voltage.

3. The circuit of claim 1 wherein said transistors are of the p-n-p type, and said signal output means transmits a pulse signal whenever said control means receives a pulse signal and said varying voltage is more negative than said reference voltage.

References Cited

UNITED STATES PATENTS

| | | | |
|---|---|---|---|
| 3,033,996 | 5/1962 | Atherton | 331—112 X |
| 3,048,715 | 8/1962 | Horton | 307—88.5 |
| 3,080,488 | 3/1963 | Sem-Sandberg | 307—88.5 |

ARTHUR GAUSS, *Primary Examiner.*

DAVID J. GALVIN, *Examiner.*

J. JORDAN, *Assistant Examiner.*